United States Patent [19]

Thomas et al.

[11] Patent Number: 4,894,403

[45] Date of Patent: Jan. 16, 1990

[54] POLYISOCYANATE COMPOSITIONS CONTAINING RIGID COMPOUNDS OR POLYMERS, AND POLYURETHANES PREPARED THEREFROM

[75] Inventors: Oomman P. Thomas; Richard D. Peffley, both of Lake Jackson; Earl E. Burt, III, Clute, all of Tex.

[73] Assignee: The Dow Chemical Company, Midland, Mich.

[21] Appl. No.: 73,045

[22] Filed: Jul. 14, 1987

[51] Int. Cl.$^4$ .............................................. C08G 18/14
[52] U.S. Cl. ...................................... 524/216; 524/197; 524/198; 524/199; 524/722; 525/127; 525/123; 521/137; 521/115; 521/128
[58] Field of Search ............... 524/197, 198, 199, 216, 524/722; 521/137, 115, 128; 525/127, 123

[56] References Cited

U.S. PATENT DOCUMENTS

| | | | |
|---|---|---|---|
| 4,332,716 | 6/1982 | Shah | 524/197 |
| 4,399,239 | 8/1983 | Herwig et al. | 521/137 |
| 4,701,475 | 10/1987 | Turner | 521/137 |
| 4,745,135 | 5/1988 | Thomas et al. | 524/198 |
| 4,745,136 | 5/1988 | Thomas et al. | 524/198 |
| 4,745,137 | 5/1988 | Thomas et al. | 521/137 |
| 4,746,684 | 5/1988 | Kuriyama et al. | 521/137 |

OTHER PUBLICATIONS

Sato, "Research Progress in Thermotropic Liquid Crystal Polyurethanes", *Porima Daijesuto*, vol. 37, No. 6, pp. 10–16 (1985).
Japanese Application Disclosure No. 56-152830, published Nov. 26, 1981.
Jadhav and Kantor, "Liquid Crystalline Polyurethanes (LLPU): A New Class of Anistropic Polymers", published at the Gordon Research Conference on Polymers Liquid Crystals on Jul. 7-11, 1986.

*Primary Examiner*—John Kight
*Assistant Examiner*—Dennis R. Daley

[57] ABSTRACT

Polyisocyanates containing dissolved or colloidally dispersed polymers containing rigid moieties are disclosed. Included among the dissolved or colloidally dispersed polymers are polymers ethylenically unsaturated polyaromatic compounds, ethylenically unsaturated benzoic acid derivatives, ethylenically unsaturated steroid derivatives, and rigid aromatic polyurethane and/or polyurea polymers. The dissolved or colloidally dispersed polymers provide substantial reinforcement and physical property improvement to polyurethane or polyurea polymers made from the polyisocyanate solution or dispersion.

13 Claims, No Drawings

POLYISOCYANATE COMPOSITIONS CONTAINING RIGID COMPOUNDS OR POLYMERS, AND POLYURETHANES PREPARED THEREFROM

BACKGROUND OF THE INVENTION

This invention relates to polyisocyanate compositions containing polymers having a plurality of such moieties, as well as to polyurethanes which are prepared from such polyisocyanate compositions.

Polyurethanes, polyureas and similar polymers are commercially prepared by reacting an active hydrogen-containing composition with a polyisocyanate. By varying the characteristics of the polyisocyanate and the active hydrogen-containing composition, polymers having widely varying properties can be prepared. For example, by using relatively low equivalent weight, high functionality precursor materials, rigid polyurethanes are prepared. Conversely, flexible polyurethanes are prepared by using relatively high equivalent weight, low functionality precursor materials. By using or omitting blowing agents, cellular or non-cellular polyurethanes are prepared. Accordingly, polyurethanes can be prepared which are useful in a wide variety of applications.

It is often desirable to reinforce the polyurethane to give it better properties. For example, in preparing flexible polyurethane foams, it is known to employ dispersions of reinforcing polymer particles in a polyether polyol in order to obtain higher load-bearing and good cell opening. Similarly, the use of reinforcing fibers and fillers is common in non-cellular polyurethanes as well.

Due to the high cost of the reinforcing agents, and the processing difficulties imposed by their use, it is desirable to use the smallest amount thereof which provides adequate reinforcement. It is also desirable that the reinforcing agent be soluble or stably dispersable in the precursor materials used to make the polyurethane. Otherwise, the composition of the precursor material containing the reinforcing agent will vary over time, leading to compositional fluctuations during the processing of the polyurethane. Although these problems can often be resolved by continuously stirring the precursor material, this requires the use of special equipment which increases the overall cost of the polyurethane.

In addition, it is always desirable to further improve the properties of polyurethanes.

It would therefore be desirable to provide a polyurethane and/or polyurea polymer having improved physical properties. It would also be desirable to provide a precursor material containing a dissolved or stably dispersed reinforcing agent, which is useful in the preparation of polyurethanes.

SUMMARY OF THE INVENTION

In one aspect, this invention is a high molecular weight polyurethane and/or polyurea polymer, which is prepared in the reaction of a liquid polyisocyanate and an active hydrogen-containing composition containing at least one active hydrogen-containing compound, wherein the polyisocyanate contains dissolved or dispersed therein a polymer containing a plurality of rigid reinforcing moieties.

In another aspect, this invention is a solution or dispersion of a polymer containing a plurality of rigid reinforcing moieties in a polyisocyanate.

In another aspect, this invention is a solution or dispersion in a polyisocyanate of a polymer of an ethylenically unsaturated monomer having a rigid moiety comprising at least two aromatic nuclei which are connected by a covalent bond or a rigid connecting group.

In another aspect, this invention is a solution or dispersion in a polyisocyanate of a polymer of an ethylenically unsaturated derivative of a rigid steroid.

In another aspect, this invention is a solution of dispersion in a polyisocyanate of a polymer of an ethylenically unsaturated benzoic acid derivative.

In another aspect, this invention is a solution or colloidal dispersion in a polyisocyanate of a substantially linear polyurethane and/or polyurea polymer prepared in the reaction of an aromatic diol or diamine with an aromatic diisocyanate.

The applicants have found that the use of a solution or dispersion of this invention to prepare a polyurethane or polyurea provides it with substantially improved physical properties. Although the invention is not limited to any theory, the rigid moieties in the dissolved or dispersed polymer are believed to act as microscopic reinforcing agents for the polyurethane. Accordingly, the polymer provides very substantial improvements in properties even when present in relatively small quantities.

DETAILED DESCRIPTION OF THE INVENTION

In this invention, a polyisocyanate is used in preparing a polyurethane polymer. The polyisocyanate is characterized in that it has dissolved or colloidally dispersed therein a polymer having a plurality of rigid reinforcing moieties. By "colloidally dispersed", it is meant that the polymer is present in a polyisocyanate in the form of particles having an average diameter of about 10–1000 nm.

The dispersed or dissolved polymer contains a plurality of rigid reinforcing moieties which may be incorporated into the polymer backbone, but are preferably pendant. Such rigid moieties are characterized in that they are elongated and relatively inflexible. Preferably, the rigid moiety has an aspect ratio (length/diameter ratio) of at least about 2.4. Within the term "rigid reinforcing moiety" are included materials containing groups which exhibit liquid crystalline characteristics, either in monomeric or polymeric form. Such groups are characterized in forming an aggregate which exhibits a nematic, twisted nematic (cholesteric) or smectic ordering.

A wide variety of polymers which contain a plurality of rigid reinforcing moieties may be used in this invention. One class of such polymers includes substantially linear polyurethanes and/or polyureas prepared in the reaction of an aromatic diol or diamine with an aromatic diisocyanate. Particularly suitable polymers of this type are prepared by reacting a para-substituted diisocyanate with a para-substituted diol or diamine, or halogen or alkyl derivatives thereof, especially those derivatives which are symmetrically substituted. The diamines are generally preferred over the diols due to the superior stability of their reaction products. Especially preferred diisocyanates include p-phenylenediisocyanate, 4,4'-diphenylmethanediisocyanate, 3,3'-dimethyl-4,4'-diphenylmethanediisocyanate, 3,3'-diethyl-4,4'-diphenylmethanediisocyanate, 3,3',5,5'-tetramethyl-4,4'-diphenylmethanediisocyanate, 3,3',5,5'-tetraethyl-4,4'-diphenylmethanediisocyanate and the like. Especially preferred aromatic diamines include p-phenylenediamine, 4,4'-methylenedianiline, 3,3'-dimethyl-4,4'-methylenedianiline, 3,3'-diethyl-4,4'-methylenedianiline, 3,3',5,5'-tetramethyl-4,4'-methylenedianiline, 3,3',5,5'-tetraethyl-4,4'-methylenedianiline and the like. Especially preferred diols include hydroquinone and the diverse para-substituted bisphenols, such as bisphenol A. An especially preferred rigid polymer is the reaction product of 4,4'-methylene dianiline and 4,4'-diphenylmethanediisocyanate. Such polymers may be produced by any convenient technique, but are advantageously and preferably produced by a solution polymerization technique wherein the monomers are polymerized in a solvent in which the monomers are soluble, and in which the polymer is soluble at least until it has sufficient molecular weight to achieve the required aspect ratio. Such solvent is preferably not reactive with a polyisocyanate. For the preferred rigid polyurea polymer, a suitable solvent is dimethylformamide, or a solution thereof containing about 0.5 to about 20%, preferably about 1 to about 5% by weight of an inorganic salt such as lithium chloride. Advantageously, the polymer is dissolved or dispersed into the polyisocyanate by mixing the solution thereof with the polyisocyanate, and then stripping the solvent. Alternatively, the solvent may remain with the resulting solution or dispersion.

One important class of polymers which may be dispersed in the polyisocyanate include polymers and copolymers of ethylenically unsaturated monomers which contain a rigid moiety. Such polymer can be of any molecular weight as long as it is soluble or colloidally dispersable in a polyisocyanate, and its rigid moieties can aggregate to form a reinforcing structure, as evidenced by improved properties. If the polymer contains liquid crystalline moieties, its molecular weight and structure is preferably such that these moieties can undergo a phase transition to a mesomorphic state under the conditions of temperature and shear as are encountered in the reaction of the polyisocyanate to form a polyurethane and/or polyurea polymer. More preferably, the polymer undergoes such phase change at a temperature from about 40° to about 130° C.

When the polymer is to be dispersed rather than dissolved, in the polyisocyanate, the molecular weight and particle size of the polymer are advantageously such that it is colloidally dispersed in the polyisocyanate. It is also preferable that the molecular weight and composition of the polymer are chosen together such that the polymer can assume a reinforcing morphology at some temperature below that at which the polymer and the polyisocyanate degrade. Preferably, the dispersed polymer undergoes such change in morphology under conditions of temperature and shear such as are encountered in the reaction of the polyisocyanate with an active hydrogen-containing compound to form a polyurethane and/or polyurea polymer.

Exemplary ethylenically unsaturated monomers are described, for example, in Blumstein, et al, "Liquid Crystalline Order in Polymers with Mesogenic Side Groups", *Liquid Crystalline Order in Polymers*, A. Blumstein, ed., Academic Press, Inc., New York (1978), incorporated herein by reference. Ethylenically unsaturated monomers which contain substantially linear, rigid groups are useful herein. Such monomers include ethylenically unsaturated biphenyls; cyclohexyl-phenyl compounds; certain conjugated dienes; diverse monomers containing ethylenic unsaturation and an internal grouping according to structure I, and ethylenically unsaturated steroids and other monomers such as are described in Tables 1-4, pages 108-120 of Blumstein, supra.

One important type of such monomers contains a polyaromatic grouping comprising at least two aromatic nuclei which are connected by a covalent bond or a rigid linking group. Exemplary such polyaromatic monomers contain a moiety as represented by structure I

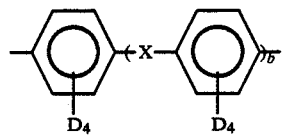

wherein each D is independently hydrogen or an inert substituent group which, when ortho to the —X— linkage, may be such that the linkage —X—, the aromatic rings and the groups D from each ring form a cyclic structure. b is a number from about 1 to about 10, preferably about 1 to about 3, more preferably about 1 to about 2, and each X is independently a covalent bond, or a group which provides a rigid linkage between the aromatic rings. Exemplary groups X include cycloalkyl groups, heterocyclic groups and linking groups which are capable of participating in conjugation with the aromatic rings, or permit the rings to participate in conjugation with each other. Suitable such groups include

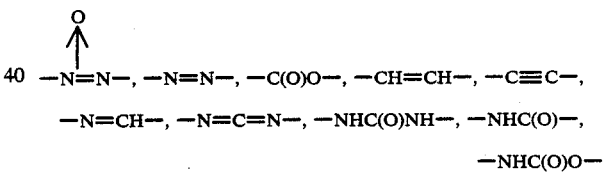

and the like. The group —X— may also be alkylene when it forms a cyclic structure with the groups D orthoto the —X— linkage. In describing the groups D as inert, it is meant that they do not undesirably react with the polyisocyanate, undesirably interfere with the reaction of the polyisocyanate with an active hydrogen-containing compound, or destroy the rigid, reinforcing character of the polyaromatic compound. Exemplary such groups D include hydrogen, inertly substituted lower alkyl groups or halogen. Most preferably, the groups D are selected such that the polyaromatic compound is symmetrical.

Suitable Schiff base derivatives (i.e., X in structure I is —N=C—) include but are not limited to two major types, the styrene derivatives and the acryloyl or methacryloyl derivatives. The styrene derivatives can be represented by structure II

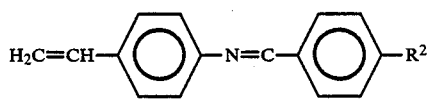

wherein $R^2$ is a radical which does not undesirably affect the rigid character of the monomer or the solubility or dispersibility of polymers thereof in a polyisocyanate. Exemplary groups $R^2$ include cyano, halogen, straight chain alkyl ether, alkyl, phenyl, cyclohexyl and —CH=CHCOOR$^3$, wherein $R^3$ is a straight chain alkyl, cycloalkyl, especially cyclohexyl, acetyl, carboxylic acid or ester group, amido group, alkoxy, especially cyclohexyloxy or the like.

The styrene-based Schiff base derivatives are advantageously prepared by reacting p-amino styrene with a p-substituted benzaldehyde according to Equation 1

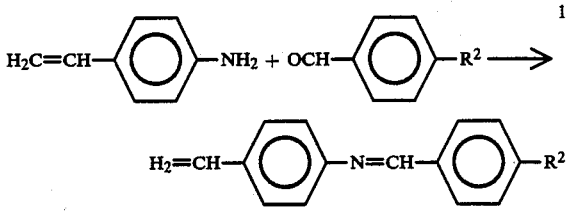

wherein $R^2$ is as defined before. The p-amino styrene itself can be prepared by the reduction of p-nitrostyrene or the dehydration of para-2-hydroxyethyl aniline.

The acryloyl or methacryloyl Schiff base derivatives are advantageously prepared by reacting the corresponding acid chloride with p-hydroxybenzaldehyde to form an unsaturated aldehyde, and further reacting the aldehyde with a para-substituted aniline, as illustrated by Equation 2:

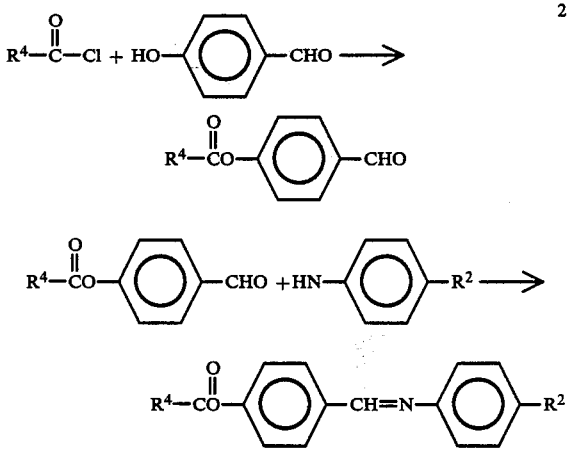

wherein $R^2$ is as defined before, and $R^4$ is CH$_2$=CH— or CH$_2$=C(CH$_3$)—.

Benzoic acid derivatives can be represented by structure III

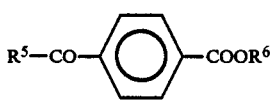

wherein $R^5$ represents an inertly substituted radical having polymerizable ethylenic unsaturation and $R^6$ represents hydrogen or an inertly substituted organic radical, preferably devoid of polymerizable ethylenic unsaturation. As used in this application, the term "inertly substituted" means that the moiety referred to has no substituent group, or only has substituent groups which do not undesirably react with the polyisocyanate, undesirably interfere with the reaction of the polyisocyanate with an active hydrogen-containing compound, or destroy the rigid, reinforcing character of the polyaromatic compound. Such benzoic acid derivatives can be prepared by reacting an acid chloride with a p-hydroxy benzoic acid or ester thereof according to Equation 3:

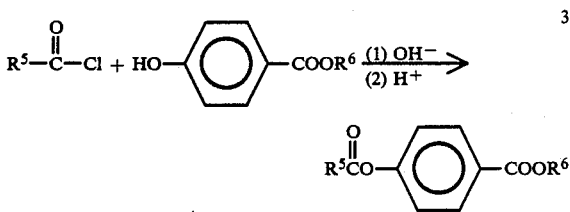

wherein $R^5$ and $R^6$ are as defined before. Preferably, $R^5$ is H$_2$C=CH—, H$_2$C=C(CH)—, H$_2$C=C(CH)CH—, H$_2$C=CHOCH$_2$CH$_2$— or similar group. $R^6$ is preferably hydrogen or a relatively rigid hydrocarbyl group, and more preferably hydrogen or a cycloaliphatic group. $R^6$ is most preferably hydrogen, as the corresponding acid can dimerize to form a dimer effectively having a linear, three-ring conjugated structure of high aspect ratio.

Other suitable monomers include ethylenically unsaturated derivatives of the polyaromatic compounds described on pp. 61–107, Kelker and Hatz, *Handbook of Liquid Crystals*, Verlag Chemie GmbH, 1980, incorporated herein by reference.

Suitable steroid derivatives may be prepared by reacting a unsaturated acid, an unsaturated acid chloride or unsaturated isocyanate with cholesterol or cholestanol. Such derivatives can be represented by structure IV $$R^5\text{-Y-A} \qquad \text{IV}$$

wherein A represents

[structure V]

or

[structure VI]

or other rigid steroid, Y represents —COO—, —NHCOO—, —RCOO—, or —NRCOO— and $R^5$ is as defined before. In such steroid derivatives, $R^5$ is advantageously CH$_2$=CH—, CH$_2$=C(CH$_3$)—, CH$_2$=CH—(CH$_2$)w—, trans—CH$_3$CH=CH— (wherein w is a number from about 1–10, preferably about 1–4), isopropenylphenyl and the like, as well as a straight chain mono or poly-unsaturated hydrocarbyl group. Suitable steroid derivatives are described on Table 3, pages 116–117 of Blumstein, supra, as well as pp. 108–112 of *Handbook of Liquid Crystals*, supra, both incorporated herein by reference. Other suitable steroid derivatives include ethylenically unsaturated derivatives of steroids such as disclosed on pp. 108–112 of Kelker and Hatz, supra. These can typically be prepared by reacting an unsaturated acid, acid chloride or isocyanate with the hydroxyl group of the corresponding steroid. Alternatively, an unsaturated ester can be reacted with an ester of the corresponding steroid in a transesterification reaction to provide the unsaturated derivative. Of such steroid derivatives, the cholesterol derivatives of isocyanatoethyl methacrylate or other unsaturated isocyanate are preferred due to their ease of manufacture.

An addition polymer containing pendant rigid groups can be prepared by a free-radical polymerization of an ethylenically unsaturated monomer as described before. Suitable processes for the free-radical polymerization of ethylenically unsaturated monomers are well known in the art, and reference is made thereto for the purposes of this invention. The polymerization is conducted under conditions such that the resulting polymer is soluble or dispersible in a polyisocyanate.

Solution polymerization techniques are particularly suitable for polymerizing the ethylenically unsaturated monomer. In such solution polymerization, the monomer is polymerized in the presence of an inert solvent. By "inert" it is meant that the solvent does not react with the monomer or otherwise undesirably interfere with the polymerization. When a solvent is used, it is advantageously stripped from the polymer after it is dissolved or dispersed in the polyisocyanate. Alternatively, the monomer can be polymerized in situ in the polyisocyanate. In such in situ polymerization, it is preferred practice to employ a dispersant to aid in the solubility or dispersibility of the resulting polymer. Particularly suitable dispersants include adducts of the polyisocyanate with a difunctional compound having an isocyanate reactive group and an ethylenically unsaturated group, such as an ethylenically unsaturated alcohol, carboxylic acid, carboxylic acid, amine or the like.

The polymerization of the ethylenically unsaturated rigid monomer is advantageously conducted in the presence of a source of free radicals. Any of the common free radical initiators such as the well-known organic peroxides, peroxyesters and azo compounds are suitable for that purpose. In addition, radiation or other free radical sources can be used.

The polymerization is advantageously conducted at a temperature from about −20° C. to about 150° C. The optimum polymerization temperature is, of course, dependent on the particular monomer used, the particular free radical initiator used, if any, and other circumstances which are well known in polymerizing ethylenically unsaturated monomers.

In order to control the molecular weight of the polymer, it may be advantageous to adjust the level of initiator used, or to employ a chain transfer agent in the polymerization. Typically, the use of a greater quantity of a free radical initiator or chain transfer agent tends to decrease the molecular weight of the resulting polymer.

Thus, a free radical initiator is advantageously employed in an amount from about 0.01 to about 10, preferably about 0.05 to about 5 parts per 100 parts monomer. Suitable chain transfer agents include, for example, mercaptans, carboxylic acids, halogen containing compounds and the like. These and other suitable chain transfer agents are described, for example, in European Patent Publication 0091036A2, incorporated herein by reference.

The rigid monomer may be homopolymerized, or copolymerized with another monomer which may or may not possess a rigid moiety. Any such copolymerization may be a random copolymerization, or a block or graft copolymerization. The sole limitation on such other monomer is that it must be of such composition and present in such an amount such that the rigid units in the polymer can aggregate to form a reinforcing structure. This is generally achieved when at least about 25, preferably about 35–100, more preferably about 50–100 mole percent of the monomers employed in its preparation are rigid monomers.

Suitable monomers which are useful comonomers include those described in U.S. Pat. No. 4,394,491, incorporated by reference. Of particular interest are the acrylic and methacrylic esters; the unsaturated nitriles, particularly acrylonitrile; and the vinyl aromatics, particularly styrene.

In addition to polymers of ethylenically unsaturated monomers, polymers of other types of monomers are useful herein as long as the resulting polymer contains pendant rigid groups. Of particular interest are polypeptides such as poly(g-benzyl-L-glutamate) as described by DuPre, "Liquid Crystals", *Kirk-Othmer Encyclopedia of Chemical Technology*, 3d ed. Vol. 14, pp. 395–427, John Wiley and Sons, N.Y. (1981), incorporated by reference.

A particularly suitable class of polymers are prepared by reacting a polyisocyanate with a difunctional monomer containing an isocyanate-reactive group and ethylenic unsaturation to form an ethylenically unsaturated adduct. This adduct is then copolymerized with an ethylenically unsaturated rigid monomer, and one or more comonomers if desired, to form a polymer containing repeating rigid units. Most preferably the polyisocyanate used to prepare the adduct is the same as or at least soluble in the polyisocyanate in which the resulting polymer is to be dispersed or dissolved.

The preparation of the adduct and the subsequent copolymerization thereof is conveniently done in situ in the polyisocyanate. A minor amount of the difunctional monomer, i.e. about 0.001 to about 0.5, preferably about 0.01 to about 0.2 mole per mole of polyisocyanate, is added to the polyisocyanate and caused to react therewith to form an adduct. After the formation of the adduct, the rigid monomer is added and copolymerized with the adduct. The formation of the adduct is advantageously conducted at a temperature of about 20°–120° C. A urethane catalyst as described later may be used if desired. The adduct is advantageously prepared in the substantial absence of a free radical source, in order to prevent homopolymerization of the difunctional monomer or the adduct. The copolymerization of the adduct with the rigid monomer is advantageously conducted at a temperature of about 30° to about 150° C. in the presence of a free-radical initiator. Suitable free-radical initiators include organic peroxides, peroxyesters and azo-type initiators. In the copolymerization reaction, additional monomers which do not contain rigid moieties may also be used, as discussed before.

In making the adduct, the most preferred difunctional monomer is a hydroxy-containing monomer such as vinyl alcohol or a hydroxyalkyl acrylate or methacrylate, such as hydroxyethylacrylate or hydroxyethylmethacrylate.

The polyisocyanate used herein is any which has properties suitable for preparing the desired polyurethane. These polyisocyanates include those having aromatically bound isocyanate groups as well as those which contain isocyanate groups bound to aliphatic carbon atoms.

Aromatic polyisocyanates which are particularly useful herein include 2,4- and/or 2,6-toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an —NCO content of about 0.5 to about 30% by weight are useful herein.

The solution or dispersion of this invention advantageously contains a sufficient proportion of the polymer containing rigid reinforcing moieties to measurably improve the properties of a polyurethane and/or polyurea polymer prepared therefrom. Preferably, the amount of the polymer containing rigid moieties is less than amount which causes precipitation of thereof, or causes the polymer to form low aspect ratio particles. Obviously, such amount will depend substantially on the solubility of the particular polymer in the particular polyisocyanate. However, solutions or dispersions containing from about 1 to about 80, more preferably about 3 to about 30 weight percent of said polymer containing rigid reinforcing moieties, based on the weight of the solution or dispersion, generally provide desirable property improvements.

A polyurethane is prepared from the polyisocyanate composition of this invention, by reacting it with at least one active hydrogen-containing compound. The polyisocyanate is advantageously present in an amount sufficient to provide in the reaction mixture from about 70 to about 500, preferably about 80 to about 150, and more preferably about 95 to about 120 isocyanate groups per 100 active hydrogen-containing groups. Higher amounts of the polyisocyanate can be used when the formation of an isocyanurate-containing polymer is desired.

In general, noncellular polyurethane and/or polyurea elastomers (those having an unfilled density of at least about 0.8 g/cc) are prepared by reacting a relatively high equivalent weight active hydrogen-containing compound (preferably 800–3000 molecular weight) and a chain extender compound with a polyisocyanate. The relatively high equivalent weight active hydrogen-containing compound may be of any suitable composition, but is preferably a polyether or a polyester. More preferably, its a hydroxyl-terminated or primary or secondary amine-terminated polyether. The chain extender compound advantageously has an equivalent weight of from about 31–250 and a functionality of about 2 to about 4, preferably about 2. The chain extender is preferably an α,ω-alkylene glycol, an α,ω-glycol ether or an aromatic diamine, with $C_2$–$C_6$ alkylene glycols and stearically hindered aromatic diamines being preferred. In preparing noncellular or microcellular elastomers, a conventional casting process, particularly a solventless casting process, or a reaction injection molding process can be employed. Suitable casting techniques are described, for example, in U.S. Pat. No. 4,556,703. Reaction injection molding techniques are described, for example, in Sweeney, F. M., *Introduction to Reaction Injection Molding*, Technomics, Inc., 1979, incorporated by reference. Suitable formulations for use in RIM processes are described, for example, in U.S. Pat. Nos. 4,269,945, 4,218,610, 4,297,444, 4,530,941, all incorporated by reference. In these formulations, substitution of all or a portion of the polyisocyanate with a solution of dispersion of this invention having a similar equivalent weight, functionality and reactivity is made.

In preparing elastomeric polyurethane and/or polyurea polymers, either a one-shot or two-shot (i.e. prepolymer) process can be employed. In the two-shot process, all or most of the relatively high equivalent weight active hydrogen-containing compound is reacted with an excess of the polyisocyanate solution or dispersion to form an isocyanate-terminated prepolymer, which is then reacted with the chain extender and any remaining high equivalent weight material. In the one-shot process, most or all of the relatively high equivalent weight material is mixed with the chain extender and the mixture is reacted with the polyisocyanate. However, certain prepolymers and quasi-prepolymers may be employed as the polyisocyanate component even in a one-shot process. Preferably, the polyurethane and/or polyurea polymer is cellular, i.e. has an unfilled density of less than about 0.8 g/cc. More preferably, the polyurethane and/or polyurea is a flexible polyurethane foam. Such flexible polyurethane foam is advantageously prepared by reacting a relatively high equivalent weight polyol with the polyisocyanate composition of this invention in the presence of a blowing agent. In preparing flexible polyurethane foams, it is advantageous to also employ a surfactant to stabilize the foaming reaction mass and to compatibilize the various components of the reaction mixture, and to employ various catalysts for both the urethane forming and blowing reactions. In addition, a crosslinker such as diethanolamine is often employed to promote rapid initial curing.

In preparing flexible polyurethane foam, the major component of the active hydrogen-containing compound(s) advantageously has an equivalent weight of about 800–3000 and an average functionality (defined herein as the number of active hydrogen-containing groups per molecule) from about 2 to about 4, more preferably about 2–3. This material is preferably a polyester or polyether, and more preferably is a hydroxyl-terminated or secondary amine-terminated polyether.

Suitable blowing agents for preparing foams are well known and include, for example, water, low boiling halogenated alkanes such as methylene chloride, monochlorodifluoromethane, dichlorodifluoromethane, dichloromonofluoromethane and the like, the so-called "azo" blowing agents, finely divided solids and the like as well as other materials which generate a gas under the conditions of the foaming reaction. Water, the halogenated methanes or mixtures thereof are preferred.

When water is used as the blowing agent, about 0.5 to about 10, preferably about 1 to about 5 parts by weight are advantageously used per 100 parts of active hydrogen-containing compound(s). The halogenated alkanes are typically used in an amount from about 5 to about 75 parts per 100 parts by weight of active hydrogen-containing compound(s). However, the use of varying amounts of blowing agents to achieve a desired density is well known in the art, and it may in some instances be advantageous to use amount of blowing agents outside of the ranges mentioned before.

Suitable surfactants include the diverse silicone surfactants, preferably those which are block copolymers of a polysiloxane and a poly(alkylene oxide). Suitable such surfactants include Y-10184 surfactant, available from Union Carbide Corporation, and the like. Surfactants are used in an amount sufficient to stabilize the foaming reaction mixture against collapse until the foam is cured, and to promote the formation of a somewhat uniform cell structure. Typically, about 0.1 to about 5, preferably about 0.3 to about 3, parts by weight of surfactant are employed per 100 parts of active hydrogen-containing compound(s).

Crosslinkers which are commonly employed in preparing flexible polyurethane foams include low equivalent weight alkanolamines such as ethanolamine, diethanolamine, triethanolamine, propanolamine, dipropanolamine, tripropanolamine, methyldiethanol amine, methyl dipropanol amine, and the like. Also useful are the alkylene glycols and low equivalent weight hydroxyl-terminated polyols such as glycerine and trimethylol propane. Such crosslinkers are generally used in minor amounts, preferably about 0.2 to about 10, more preferably about 0.5-5 parts per 100 parts of relatively high equivalent weight active hydrogen-containing compounds. Catalysts for preparing polyurethane and/or polyurea foams include organometallic catalysts and tertiary amine compounds. Of the organometallic catalysts, organotin catalysts are generally preferred. Suitable catalysts are described, for example, in U.S. Pat. No. 4,495,081, incorporated herein by reference. When using such catalysts, an amount sufficient to increase the rate of the urethane-forming (and foaming reactions, when a cellular polymer is formed) is used. Typically, about 0.001 to about 0.5 part of an organometallic catalyst is used per 100 parts of active hydrogen-containing compound(s). Tertiary amine-containing compounds are used in amounts ranging from about 0.1 to about 3 parts per 100 parts of active hydrogen-containing material. When polyisocyanurate foams are produced, alkali metal compounds are useful trimerization catalysts.

The foam can be prepared in any convenient manner. The foam can be prepared by reacting the components in a closed mold, or by permitting the reacting components to freely rise. Processes for preparing polyurethane foams are described, for example, in U.S. Pat. No. 4,451,588, incorporated by reference.

In addition to preparing flexible foams and noncellular elastomers, the polyisocyanate composition of this invention is useful in preparing rigid cellular and noncellular polyurethane and/or polyurea polymers. Methods for making such materials are described, for example, in U.S. Pat. Nos. 4,579,844 and 4,569,951, incorporated herein by reference. Rigid polyurethane foams are advantageously prepared using active hydrogen-containing compounds having an equivalent weight from about 31-400 and an average functionality of about 3-16, preferably about 3 to about 8.

The polyurethane and/or polyurea polymers of this invention are useful, for example, as seating, cushioning, industrial elastomers, automobile fascia and bumpers, thermal insulation and the like.

The following examples are provided to illustrate the invention, but are not intended to limit the scope thereof. All parts and percentages are by weight unless otherwise indicated.

EXAMPLE 1

In a suitable reactor are blended 100 parts of toluenediisocyanate (TDI) and 2.3 parts of hydroxyethylacrylate (HEA). This mixture is heated to about 40° C. for a period of 60 minutes, until all the HEA has reacted with the TDI to form an ethylenically unsaturated isocyanate. This ethylenically unsaturated isocyanate is then copolymerized with about 10 parts of an ethylenically unsaturated monomer having the structure VII.

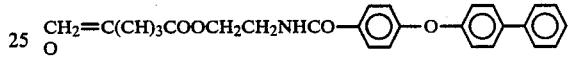

VII

This polymerization reaction is conducted by adding the monomer to the polyisocyanate, padding with nitrogen, heating to 100° C. and adding, over a 30 minute period, 0.04% based on the weight of monomers of an azo catalyst dissolved in a small amount of TDI. After the catalyst is added, the mixture is maintained at 100° C. for an additional three hours. The resulting product is a solution containing about 10 weight percent of the copolymer in TDI.

The foregoing solution is reacted with an active hydrogen-containing composition to make a flexible polyurethane foam (Sample No. 1). The active hydrogen-containing composition contains components as indicated in Table 1 following. The reaction is carried out at a 105 isocyanate index (i.e., about 1.05 isocyanate groups are present per active hydrogen-containing group), so that the resulting polymer contains about 6 weight percent of the rigid polymer. The foam is made by mixing all components and placing in a preheated (145° F.) mold for two minutes, and then placing the mold in a 250° F. oven for an additional 4 minutes. The foam is then demolded while hot and crushed.

TABLE 1

| Component | Parts by Weight |
| --- | --- |
| Copolymer Polyol A[1] | 100 |
| Water | 3.8 |
| Silicone Surfactant[2] | 1.65 |
| Tertiary Amine Catalyst[3] | 0.24 |
| Catalyst A[4] | 0.12 |
| Organotin catalyst A[5] | 0.0042 |
| Diethanolamine | 1.7 |

[1] A copolymer polyol containing 10 weight percent dispersed styrene/acrylonitrile (70/30 weight ratio) particles in a 4800 molecular weight ethylene oxide-capped poly(propylene oxide) triol.
[2] DC-5043, available from Dow Corning Corporation
[3] bis(N,N—dimethylaminoethyl)amine
[4] A 33 weight percent solution of triethylenediamine in dipropylene glycol.
[5] dimethyltindilaurate.

The physical properties of the resulting foam are measured and found to be as reported in Table 2 following. For comparison, a foam is made in the same manner as Sample No. 1, except the polyisocyanate used is unmodified TDI (Comparative Sample No. A). The properties of this foam are as reported in Table 2.

TABLE 2

| Sample No. | 1 | A* |
|---|---|---|
| Density, lb/ft$^3$ | 2.1 | 2.04 |
| Tensile Strength, psi[1] | 23.7 | 19.0 |
| Elongation, %[1] | 113 | 120 |
| Tear Strength, pli[2] | 1.62 | 1.52 |
| Resiliency, %[3] | 49.0 | 52.0 |
| Compression Set, 50 Cd %[4] | 18.2 | 12.3 |
| ILD[5] | | |
| 25% | 40 | 23 |
| 65% | 118 | 62 |
| return to 25% | 28 | 19 |
| % Hysteresis Return[6] | 71 | 81 |
| Modulus[7] | 2.94 | 2.67 |
| Air Flow[8] | 1.5 | 2.8 |

*Not an example of this invention
[1] ASTM 3574-81 Test E
[2] ASTM 3574-81 Test F
[3] ASTM 3574-81 Test H
[4] ASTM 3574-81 Test D
[5] ASTM 3574 Test B. ILD is indentation load deflection.
[6] ASTM 3574
[7] Ratio of 65% ILD to 25% ILD.
[8] ASTM 3574-81

From the data in Table 2, it is seen that the inclusion of the rigid polymer in the polyisocyanate provides the polyurethane foam with significantly improved tensile strength, tear strength and, especially, load bearing (ILD). In addition, the modulus is significantly improved. Particularly surprising is that although tensile strength is improved by over 20%, elongation, which usually falls sharply with increasing tensile strength, drops only slightly with the use of the polyisocyanate composition of this invention. Resiliency and compression set, although mildly diminished with this invention, are considered quite good.

EXAMPLE 2

A TDI solution containing 15 weight percent of a polymer of the rigid monomer used in Example 1 is prepared according to the general method described in Example 1. This solution is then diluted with TDI to a rigid polymer content of 5 weight percent. The diluted solution is designated Rigid Polymer Solution A in this example.

Various amounts of Rigid Polymer Solution A are used to replace toluenediisocyanate in a molded foam formulation. The foams so prepared are designated Sample Nos. 2–7. A comparative sample, designated Comparative Sample B, is made using TDI as the sole polyisocyanate. The "B-side" formulation is as indicated in Table 3 following.

TABLE 3

| B-side composition | |
|---|---|
| Component | Parts by Weight |
| Polyol A[1] | 60 |
| Copolymer Polyol B[2] | 40 |
| Silicone Surfactant[3] | 1.65 |
| Water | 3.8 |
| Tertiary amine catalyst[4] | 0.24 |
| Catalyst A[5] | 0.12 |
| Organotin catalyst B | 0.0042 |
| Diethanolamine | 1.7 |

[1] A 4700 molecular weight ethylene oxide-capped poly(propylene oxide) having a nominal functionality of 3.0.
[2] A copolymer polyol containing 25% SAN (70/30) solids in Polyol A.
[3] Y-10184, sold by Union Carbide Corporation.
[4] bis(N,N—dimethylaminoethyl)amine.
[5] A 33 weight percent solution of triethylene diamine in dipropylene glycol.
[6] dimethyltindlaurate.

The polyisocyanate blend used in Sample Nos. 2–7 and Comparative Sample B is as indicated in Table 4 following.

TABLE 4

| | A side composition | |
|---|---|---|
| | Parts by Weight | |
| Sample No. | Rigid Polymer Solution A | TDI |
| B* | 0 | 48.35 |
| 2 | 5 | 43.86 |
| 3 | 10 | 39.36 |
| 4 | 20 | 30.37 |
| 5 | 30 | 21.38 |
| 6 | 40 | 12.39 |
| 7 | 53.79 | 0 |

*not an example of this invention

The foams are made by mixing all components except the polyisocyanates in one batch, and separately blending the polyisocyanates into a second batch. The two batches are then rapidly stirred and placed into a 8"×8"×3" mold which is preheated to 145° F. Each foam is cured in the mold for 2 minutes, followed by in-mold heating at 250° F. in an oven for an additional four minutes. The resulting foams are testing and found to have properties as indicated in Table 5.

The data in Table 5 shows that even at very low concentrations, the rigid polymer provides improved load-bearing to the foam, while providing better cell opening (as indicated by higher air flow values) and tear strength as well. This effect is unusual, as higher air flow values generally tend to provide lower load-bearing.

TABLE 5

| Sample No. | B* | 2 | 3 | 4 | 5 | 6 | 7 |
|---|---|---|---|---|---|---|---|
| Rigid Polymer Conc.[9] | 0 | 0.51 | 1.01 | 1.98 | 2.92 | 3.81 | 5.0 |
| Density, lb/ft$^3$ | 1.87 | 1.91 | 1.88 | 1.91 | 1.90 | 1.91 | 1.89 |
| Tensile Strength, psi[1] | 20.1 | 19.8 | 19.7 | 21.4 | 21.7 | 19.6 | 22.1 |
| Elongation, %[1] | 131 | 131 | 127 | 135 | 127 | 120 | 123 |
| Tear Strength, pli[2] | 1.58 | 1.61 | 1.70 | 1.70 | 1.68 | 1.74 | 1.92 |
| Resiliency, %[3] | 48 | 54 | 53 | 54 | 52 | 53 | 52 |
| Compression Set, Cd 50%[4] | 10.2 | 9.5 | 11.3 | 10.4 | 10.3 | 10.4 | 12.3 |
| ILD[5] | | | | | | | |
| 25% | 20 | 21 | 20 | 22 | 23 | 24 | 26 |
| 65% | 52 | 55 | 57 | 60 | 61 | 61 | 65 |
| return to 25% | 16 | 17 | 16 | 17 | 18 | 18 | 20 |
| % Hysteresis Return[6] | 82 | 79 | 79 | 78 | 78 | 77 | 76 |
| Modulus[7] | 2.60 | 2.62 | 2.85 | 2.73 | 2.65 | 2.54 | 2.50 |

TABLE 5-continued

| Sample No. | B* | 2 | 3 | 4 | 5 | 6 | 7 |
|---|---|---|---|---|---|---|---|
| Air Flow[8] | 2.25 | 3.7 | 3.4 | 3.5 | 4.1 | 3.8 | 3.5 |

*Not an example of this invention
[1-8] Same as [1-8] in Table 2.
[9] Concentration of the polymer of the rigid monomer as a percentage of the combined weight of Rigid Polymer Solution A and TDI.

EXAMPLE 3

Rigid polymer solution B is prepared by polymerizing a rigid monomer represented by the structure

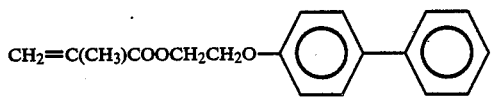

in TDI according to the procedure described in Example 1. The resulting solution contains 10 weight percent of the polymerized monomer. Rigid Polymer Solution B is then used as the sole polyisocyanate in preparing a molded polyurethane foam. The B-side and the foaming procedure are the same as used in Example 2. Rigid Polymer Solution B is used in an amount sufficient to provide a 105 isocyanate index. The resulting foam (designated Sample No. 8) has excellent properties, as indicated in Table 6.

TABLE 6

| Sample No. | 8 |
|---|---|
| Rigid Polymer Conc.[9] | 10 |
| Density, lb/ft$^3$ | 2.17 |
| Tensile Strength, psi[1] | 18.0 |
| Elongation, %[1] | 101 |
| Tear Strength, pli[2] | 1.37 |
| Resiliency, %[3] | 48 |
| Compression Set, 50 Cd %[4] | 26.2 |
| ILD[5] | |
| 25% | 23 |
| 65% | 66 |
| return to 25% | 17 |
| % Hysteresis Return[6] | 73 |
| Modulus[7] | 2.87 |
| Air Flow[8] | 2.9 |

*Not an example of this invention
[1-8] Same as [1-8] in Table 2.
[9] Concentration of the rigid polymer as a percentage of the weight of the TDI.

What is claimed is:

1. A solution or dispersion in a polyisocyanate of a polymer of an ethylenically unsaturated monomer having a rigid moiety comprising at least two aromatic nuclei which are connected by a covalent bond or a connecting group which is capable of participating in conjugation with the aromatic nuclei.

2. The solution of dispersion of claim 1 wherein said ethylenically unsaturated monomer contains a rigid moiety represented by the structure

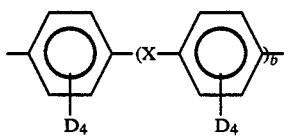

wherein each D is independently hydrogen or an inert substituent group which, when ortho to the —X— linkage, may be such that the linkage —X—, the aromatic rings and the groups D from each ring form a cyclic structure, b is a number from about 1 to about 10, and each X is independently a covalent bond, or a rigid connecting group.

3. The solution or dispersion of claim 2 wherein X is independently selected from the group consisting of a covalent bond, a cycloaliphatic group, a heterocyclic group,

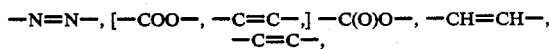
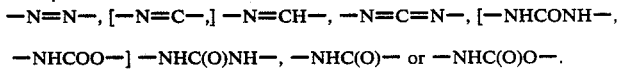

—NHCOO—] —NHC(O)NH—, —NHC(O)— or —NHC(O)O—.

4. A solution or dispersion in a polyisocyanate of a polymer of an ethylenically unsaturated benzoic acid derivative.

5. The solution or dispersion of claim 4 wherein said benzoic acid derivative is represented by the structure

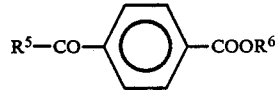

wherein $R^5$ represents an inertly substituted radical having polymerizable ethylenic unsaturation and $R^6$ represents hydrogen or an inertly substituted organic radical.

6. The solution or dispersion of claim 5 wherein $R^6$ is hydrogen.

7. A solution or dispersion in a polyisocyanate of a polymer of an ethylenically unsaturated steroid derivative.

8. The solution or dispersion of claim 7 wherein said steroid derivative is an ethylenically unsaturated cholesterol or cholestanol derivative.

9. A solution or colloidal dispersion in a polyisocyanate of a substantially linear high molecular weight polymer comprising polyurethane or polyurea groups or mixtures thereof prepared in the reaction of an aromatic diol or diamine with an aromatic diisocyanate, wherein the aromatic diol or diamine has a rigid moiety comprising at least two aromatic nuclei which are connected by a covalent bond or a rigid connecting group.

10. The solution or colloidal dispersion of claim 9 wherein said dissolved or dispersed polymer is prepared in the reaction of a para-substituted aromatic diamine and a para-substituted diisocyanate.

11. The solution or dispersion of claim 1, 4, 7, or 9 which contains from about 3 to about 30 weight percent of said dissolved or dispersed polymer, based on the weight of the solution or dispersion.

12. A process for preparing a solution or dispersion of a polymer of an ethylenically unsaturated monomer having a rigid moiety in a polyisocyanate, comprising heating a mixture comprising a base polyisocyanate, about 0.001 to about 0.5 moles of an adduct of a difunctional monomer containing an isocyanate-reactive group and ethylenic unsaturation and a polyisocyanate per mole of base polyisocyanate, and about 1-80 weight percent, based on the weight of the base polyisocyanate, of a monomer mixture containing about 25 to about 100 mole percent of a monomer having a rigid moiety comprising at least two aromatic nuclei which are connected by a covalent bond or a rigid connecting group, under conditions such that the monomer is polymerized to form a polymer dispersed or dissolved in said polyisocyanate.

13. A process for preparing a solution or dispersion of a copolymer in a polyisocyanate comprising the simultaneous steps of:
  (a) contacting a polyisocyanate with a minor amount of an isocyanate-reactive, ethylenically unsaturated difunctional monomer under reaction conditions sufficient to form an adduct dissolved or dispersed in the polyisocyanate; and
  (b) contacting the adduct dissolved or dispersed in the polyisocyanate with an ethylenically unsaturated monomer or polymer having a plurality of rigid reinforcing moieties, wherein each rigid reinforcing moiety comprises at least two aromatic nuclei which are connected by a covalent bond or a rigid connecting group, under reaction conditions sufficient to form a copolymer dissolved or dispersed in the polyisocyanate.

* * * * *